(12) United States Patent
Lawrence

(10) Patent No.: US 11,566,459 B1
(45) Date of Patent: Jan. 31, 2023

(54) CONCEALED DOOR HINGE WITH SHIFTING PIVOT POINT

(71) Applicant: B/E Aerospace, Inc., Winston-Salem, NC (US)

(72) Inventor: Robert J. Lawrence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/378,160

(22) Filed: Jul. 16, 2021

(51) Int. Cl.
| | | |
|---|---|---|
| *E05D 11/10* | (2006.01) | |
| *E05D 3/02* | (2006.01) | |
| *E05D 3/14* | (2006.01) | |
| *E05D 3/18* | (2006.01) | |
| *E05D 13/00* | (2006.01) | |
| *E05F 1/12* | (2006.01) | |

(52) U.S. Cl.
CPC .......... *E05D 11/1064* (2013.01); *E05D 3/022* (2013.01); *E05D 3/14* (2013.01); *E05D 3/18* (2013.01); *E05D 13/1207* (2013.01); *E05F 1/1253* (2013.01)

(58) Field of Classification Search
CPC ....... E05D 11/1064; E05D 3/022; E05D 3/14; E05D 3/18; E05D 13/1207
See application file for complete search history.

(56) References Cited

U.S. PATENT DOCUMENTS

| | | | | |
|---|---|---|---|---|
| 1,698,245 A | * | 1/1929 | Soss | ........................ E05D 3/186 16/358 |
| 3,001,224 A | * | 9/1961 | Soss | .......................... E05D 3/16 16/379 |
| 4,383,347 A | | 5/1983 | Conte | |
| 4,383,392 A | | 5/1983 | Conte | |
| 4,736,491 A | * | 4/1988 | Mertes | ...................... E05D 3/18 16/370 |
| 4,827,569 A | * | 5/1989 | Mertes | ...................... E05D 3/18 16/302 |

(Continued)

FOREIGN PATENT DOCUMENTS

| | | |
|---|---|---|
| CA | 2242127 C | 4/2007 |
| CN | 110318620 A | 10/2019 |

(Continued)

OTHER PUBLICATIONS

Extended European Search Report in European Application No. 22185260.1 dated Nov. 23, 2022, 6 pages.

*Primary Examiner* — Jeffrey O'Brien
(74) *Attorney, Agent, or Firm* — Suiter Swantz pc llo

(57) ABSTRACT

A hinge assembly for a swinging door includes a shifting pivot point movable between a first concealed positioned and a second extended position to provide clearance for protruding trim pieces and the like upon opening the swinging door. A double action spring mechanism energizes to drive the shifting pivot point between the first and second positions. An assembly including a link arm and a bell crank is driven by the double action spring mechanism to shift the shifting pivot point and locking mechanisms are provided to lock each of the link arm and the bell crank in their respective extended positions. A compartment assembly includes a swinging door, a fixed structure to which the swinging door is movably coupled, at least one hinge assembly according to the present disclosure.

15 Claims, 10 Drawing Sheets

(56) References Cited

U.S. PATENT DOCUMENTS

| | | | |
|---|---|---|---|
| 6,453,804 B1* | 9/2002 | Lee | A23L 3/001 |
| | | | 62/331 |
| 7,192,105 B2* | 3/2007 | Jung | E05F 5/02 |
| | | | 312/405 |
| 8,256,064 B2* | 9/2012 | Blersch | E05F 1/1292 |
| | | | 16/366 |
| 8,627,547 B2* | 1/2014 | Soh | E05D 11/0081 |
| | | | 439/31 |
| 11,221,654 B2* | 1/2022 | Chiang | G06F 1/1681 |
| 2018/0202208 A1* | 7/2018 | Siek | E05D 5/14 |
| 2020/0040633 A1 | 2/2020 | Rheaume | |
| 2020/0332578 A1* | 10/2020 | Schneider | E05D 5/046 |
| 2020/0332580 A1 | 10/2020 | Homner | |
| 2020/0399945 A1 | 12/2020 | Chadwell et al. | |
| 2021/0054670 A1 | 2/2021 | Lee | |

FOREIGN PATENT DOCUMENTS

| | | |
|---|---|---|
| CN | 111616523 A | 9/2020 |
| CN | 211818843 U | 10/2020 |
| CN | 112922475 A | 6/2021 |
| DE | 10258684 A1 | 10/2003 |
| EP | 3095701 B1 | 12/2018 |
| EP | 3760822 A1 | 1/2021 |
| EP | 3774539 A1 | 2/2021 |
| EP | 3436352 B1 | 3/2021 |
| KR | 100380372 B1 | 4/2003 |

* cited by examiner

CONCEALED DOOR HINGE WITH SHIFTING PIVOT POINT

TECHNICAL FIELD AND BACKGROUND

The present disclosure relates generally to hinge assemblies for swinging doors, and more particularly, to concealed door hinge assemblies including a spring-based mechanism for shifting the pivot point of the hinge assembly to provide concealed door hinge assemblies compatible for use with doors equipped with protruding trim pieces and the like.

Cabinets, closets, cupboards, monuments and other structures are commonly equipped with swinging doors for providing access to storage space. Conventional hinge assemblies typically include a first part for attachment to a fixed structure, a second part for attachment to the swinging door, and a link for coupling the first and second parts to permit relative movement therebetween to allow the swinging door to open and close. Many hinge assemblies utilize a coupling link including a fixed vertical pivot axis that allows the second part to pivot relative to the first part. Many swinging door configurations further utilize at least two spaced hinge assemblies to provide stability and support for the swinging door.

Depending on the hinge configuration, portions of conventional hinge assemblies extend either toward the interior of the internal compartment thereby constraining the storage space, or outward away from the door thereby providing an unsightly hinge when the swinging door is closed. In the case of passenger aircraft, to which the present disclosure finds application, a protruding hinge further introduces a head strike concern and may also impede passenger and crew movement by catching clothing, luggage, service carts and the like. In addition, conventional hinge assemblies are incompatible for use with swinging doors equipped with protruding trim pieces that interfere with other protruding trim pieces and/or surrounding structures upon opening the door.

Accordingly, what is needed are hinge assemblies including a pivot axis configured to shift as the swinging door opens, thereby providing a concealed hinge when the door is closed and a pivot axis that moves the attached edge of the door forward upon opening the door to avoid interference between protruding trim pieces and/or surrounding structure, as well as mechanisms that cause the pivot axis to shift automatically upon opening and closing the door.

SUMMARY OF THE INVENTIVE ASPECTS

To achieve the foregoing and other advantages, the inventive aspects disclosed herein are directed to concealed door hinge assemblies for hanging and supporting swinging doors.

In a first embodiment, a door hinge assembly includes a double action spring mechanism for attachment to a swinging door, a sliding carriage coupled to a translating element of the double action spring mechanism, a link arm having a first end pivotally attached to the sliding carriage and a second end forming a shifting pivot point of the swinging door, a bell crank having a first end for pivotal attachment to a fixed structure supporting the swinging door and a second end pivotally attached to the shifting pivot point of the link arm, and an actuator mechanism. The actuator mechanism is operable for translating the translating element in a first direction to energize the double action spring mechanism to translate the sliding carriage in the first direction causing the shifting pivot point to shift from a first concealed position to a second extended position, and translating the translating element in a second direction, opposite the first direction, to energize the double action spring mechanism to translate the sliding carriage in the second direction causing the shifting pivot point to shift from the second extended position to the first concealed position.

In some embodiments, the double action spring mechanism includes a spring plate forming first and second catches, a spring assembly carried on the spring plate and including a pair of extension springs each attached at one end to a first spring assembly latch and at an opposing end to a second spring assembly latch, and first and second spring-biased latches for interacting with the respective first and second catches. Movement of the spring plate in the first direction energizes the spring assembly and continued movement of the spring plate in the first direction causes the first catch to release the first spring-based latch thereby causing translation of the carriage, via a slide plate, in the first direction, and movement of the spring plate in the second direction, opposite the first direction, energizes the spring and continued movement of the spring plate causes the second latch to release the second spring-based latch thereby causing translation of the carriage, via the slide plate, in the second direction.

In some embodiments, the first position corresponds to a concealed position of the door hinge assembly in which the shifting pivot point is positioned rearward of a front face of the swinging door, and wherein the second position corresponds to an extended position of the door hinge assembly in which the shifting pivot point is positioned forward of the front face of the swinging door.

In some embodiments, the siding carriage forms a catch at one end, the link arm carries a post, and the post is captured in the catch formed at the one end of the link arm to maintain the shifting pivot point in the second extended position.

In some embodiments, the door hinge assembly further includes a locking mechanism attachable to the fixed structure and positionable proximate the bell crank, wherein the bell crank carries a post captured in the locking mechanism to maintain the shifting pivot point in the second extended position.

In some embodiments, the actuator mechanism is a mechanical actuator mechanism including a door handle assembly, a first Bowden cable coupled between the door handle assembly and the double action spring mechanism, wherein actuating the door handle assembly causes the first Bowden cable to translate the translating element in the first direction causing the shifting pivot point to shift from the first position to the second position, and a second Bowden cable is coupled between the swinging door and the double action spring mechanism, wherein closing the swinging door causes the second Bowden cable to translate the translating element in the second direction causing the shifting pivot point to shift from the second position to the first position.

In some embodiments, the actuator mechanism is an electrically activated mechanism including a door handle assembly including a latch and a catch, a micro switch, a first drive solenoid attached to the swinging door and electrically coupled to the micro switch and mechanically coupled to the translating element of the double action spring mechanism, and a second drive solenoid attachable to the fixed structure and electrically coupled to the micro switch and mechanically coupled to the locking mechanism. Depressing the door handle assembly to release the latch from the catch causes the micro switch to activate the first drive solenoid to translate the translating element in the first direction causing the shifting pivot point to shift from the first position to the second position, and re-engaging the latch with the catch causes the micro switch to activate the first drive solenoid to translate the translating element in the second direction causing the shifting pivot point to shift from the second position to the first point. The micro switch is operable for activating the second drive solenoid to lock and unlock the locking mechanism.

In another aspect, the present disclosure provides a compartment door assembly including a swinging door, a fixed structure proximate the swinging door (e.g., door frame, compartment wall, etc.), and at least one door hinge assembly as described above and configured to movably couple (e.g., hang and support) the swinging door to the fixed structure.

In some embodiments, the swinging door includes at least one protruding trim piece, the first position corresponds to a concealed position of the door hinge assembly in which the shifting pivot point is positioned rearward of the at least one protruding trim piece, and the second position corresponds to an extended position of the door hinge assembly in which the shifting pivot point is positioned forward of the at least one protruding trim piece.

In some embodiments, the assembly includes at least two hinge assemblies, positioned in spaced relation, pivotally coupling the swinging door to the fixed structure.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1B:
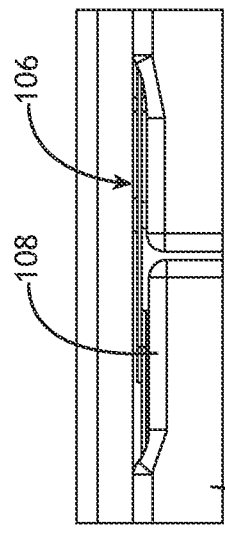
FIG. 1B is a detailed view showing one of the hinging assemblies of FIG. 1A in a retracted state.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to concealed door hinge assemblies for hanging swinging type doors and the like, door hinge assemblies including a shifting pivot point, and compartment door assemblies including the aforementioned door hinge assemblies.

Figure 1C:
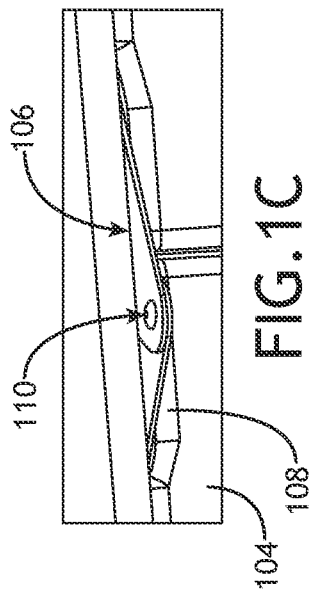
FIG. 1C is a detailed view showing one of the hinging assemblies of FIG. 1A in an extended state.
Figure 1D:
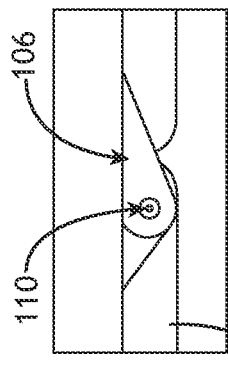
FIG. 1D is a detailed view showing protruding trim of the compartment of FIG. 1A and one of the hinging assemblies in an extended state.
Figure 1A:
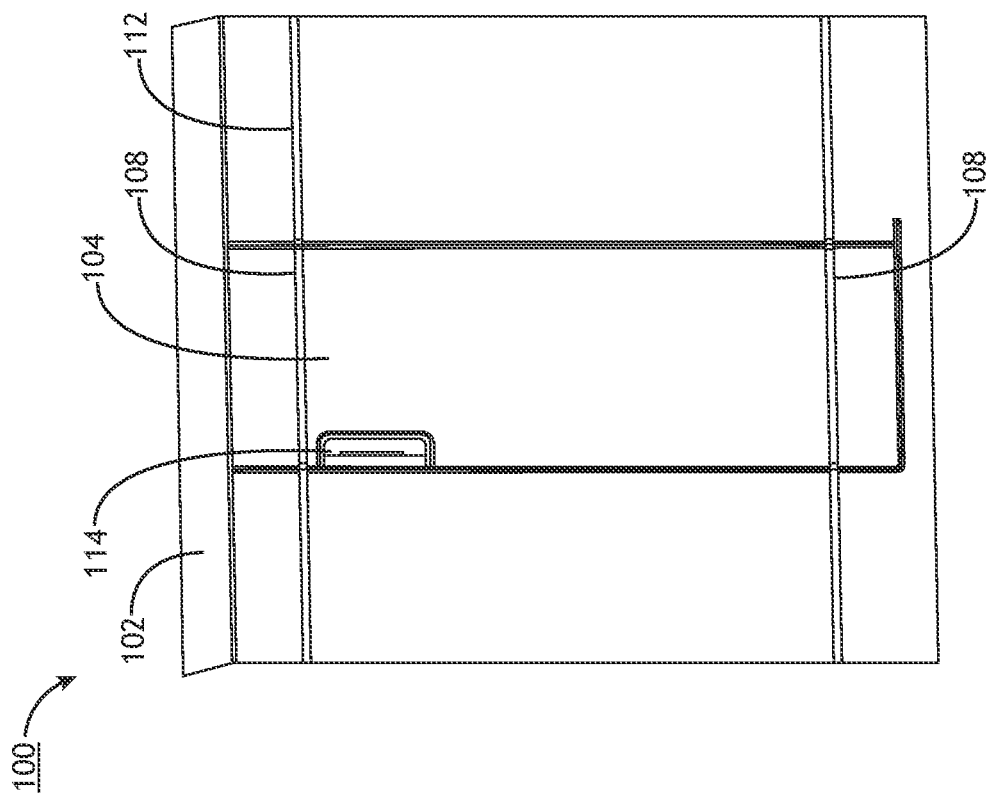
FIG. 1A is a perspective view of a non-limiting example of a compartment equipped with a swinging door hung utilizing hinging assemblies according to embodiments of the present disclosure.

Referring to FIG. 1A, a non-limiting example of a compartment door assembly shown at reference numeral 100 generally includes a fixed structure 102 for supporting a swinging door 104. As shown, the swinging door 104 closes off a storage space, for instance a storage compartment on an aircraft. As used herein, "swinging door" can include, but is not limited to, a door for closing off a storage space such as a cabinet door or a closet door, a door for closing an entrance to a room such as a bedroom, a lavatory, a galley, a living quarter, a passenger suite or a cockpit, and any other type of door benefitting from use of a door hinge assembly according to the present disclosure. As used herein, "fixed structure" can include, but is not limited to, any structure for hanging and supporting a swinging door such as a door frame, a wall, a post, a partition, a monument, etc. While the door hinge assemblies according to the present can be utilized in various applications, a particular application benefitting from the door hinge assemblies according to present disclosure includes doors equipped with protruding trim pieces, for instance door trim ½" proud or more, in which it is desired to conceal the door hinge assemblies between uses of the door, but necessary to utilize the door hinge assemblies to shift the pivot axis of the swinging door to provide clearance for the protruding trim pieces when opening and closing the door.

Referring to FIGS. 1B-1D, at least one door hinge assembly 106, and preferably at least two door hinge assemblies positioned in spaced apart relation with one door hinge assembly positioned at or proximate the top of the swinging door 104 and another door hinge assembly positioned at or proximate a bottom of the swinging door 104, serves to hang and support the swinging door as the door opens and closes. As shown in FIG. 1B, the door hinge assembly 106 is concealed from view when the swinging door is in the closed position such that no part of the assembly protrudes forward of the face of the door, or at least forward of an adjacent protruding trim piece 108.

As shown, the swinging door 104 includes protruding trim pieces 108 proximate each of the door hinge assemblies that extend forward of the front face of the door. When utilizing a conventional door hinge, protruding trim pieces such as those shown require the vertical pivot axis of the hinge to be positioned forward of the trim pieces to avoid trim interference as the door opens and closes, which is undesirable for the reasons discussed in the background section. With the door hinge assemblies 106 according to the present disclosure, the door pivot point 110, or pivot axis, can be shifted from the first or concealed position shown in FIG. 1B, to the second or extended position shown in FIG. 1C or FIG. 1D, such that the swinging door 104 is able to open and close without trim interference when the pivot point is in the second position, for instance clearing adjacent structural trim pieces 112. As discussed below, a door handle assembly 114 may function to activate shifting of the pivot point 110.

Figure 2A:
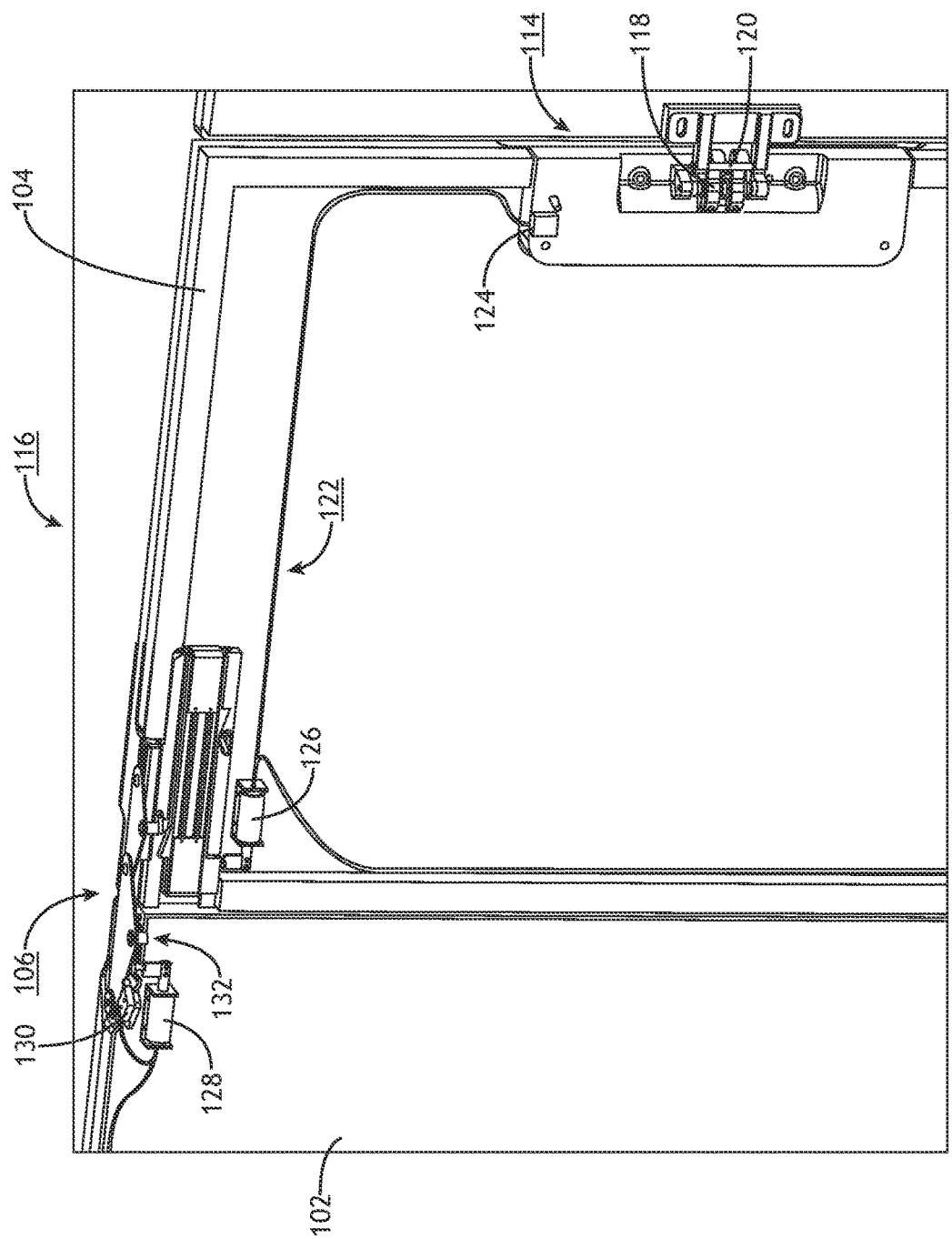
FIG. 2A is a fragmentary perspective view of a hinging assembly according to the present disclosure including an electrically actuated spring-based mechanism for extending the hinging assembly pivot point.

Referring to FIGS. 2A-2F, a cabinet door assembly 116 according to the present disclosure generally includes at least one door hinge assembly 106 attachable to the swinging door 104 and to the fixed structure 102. Although only one door hinge assembly is shown in FIG. 2A, it may be preferable to include both upper and lower door hinge assemblies to stably support and pivot the swinging door. The door handle assembly 114 attached to the door includes a latch 118 that interacts with a catch 120 on the fixed structure 102, another swinging door, etc., to maintain the door closed. An electrical actuator mechanism 122 includes a switch 124 electrically coupled to the door handle assembly 114 and to a first drive solenoid 126 interacting with a double action spring mechanism as described in detail below. In embodiments including more than one door hinge assembly 106, the switch 124 is electrically coupled to each drive solenoid mechanically coupled to its respective door hinge assembly. The electrical mechanism 122 further includes a second drive solenoid 128 electrically coupled to a micro switch 130 and mechanically coupled to a locking mechanism 132 coupled to the fixed structure 102. In embodiments including more than one door hinge assembly 106, the micro switch 130 is electrically coupled to each second drive solenoid mechanically coupled to its respective locking mechanism.

With specific reference to FIG. 2B, in use, the swinging door 104 is opened by actuating the door handle, for instance rotation depressing the handle assembly, causing the micro switch 130 to activate the first door mounted drive solenoid (s) 126 thereby energizing the double action spring mechanism, described in detail below, such that stored energy translates a translating element to cause the pivot point to extend. In addition, the micro switch 130 activates the second fixed structure mounted drive solenoid(s) 128 to lock the extended pivot point outward. The swinging door 104 is open and closed by pivoting the door while the pivot point is in the extended position. When the door latch 118 engages the catch 120, the door handle releases the micro switch 124 activating the first door mounted drive solenoid(s) 126 reversing the process and re-energizing the double action spring mechanism. In addition, the upper micro switch circuit 130 is open thereby activating the second fixed structure mounted drive solenoid(s) 128 unlocking the locking mechanisms.

Figure 2B:
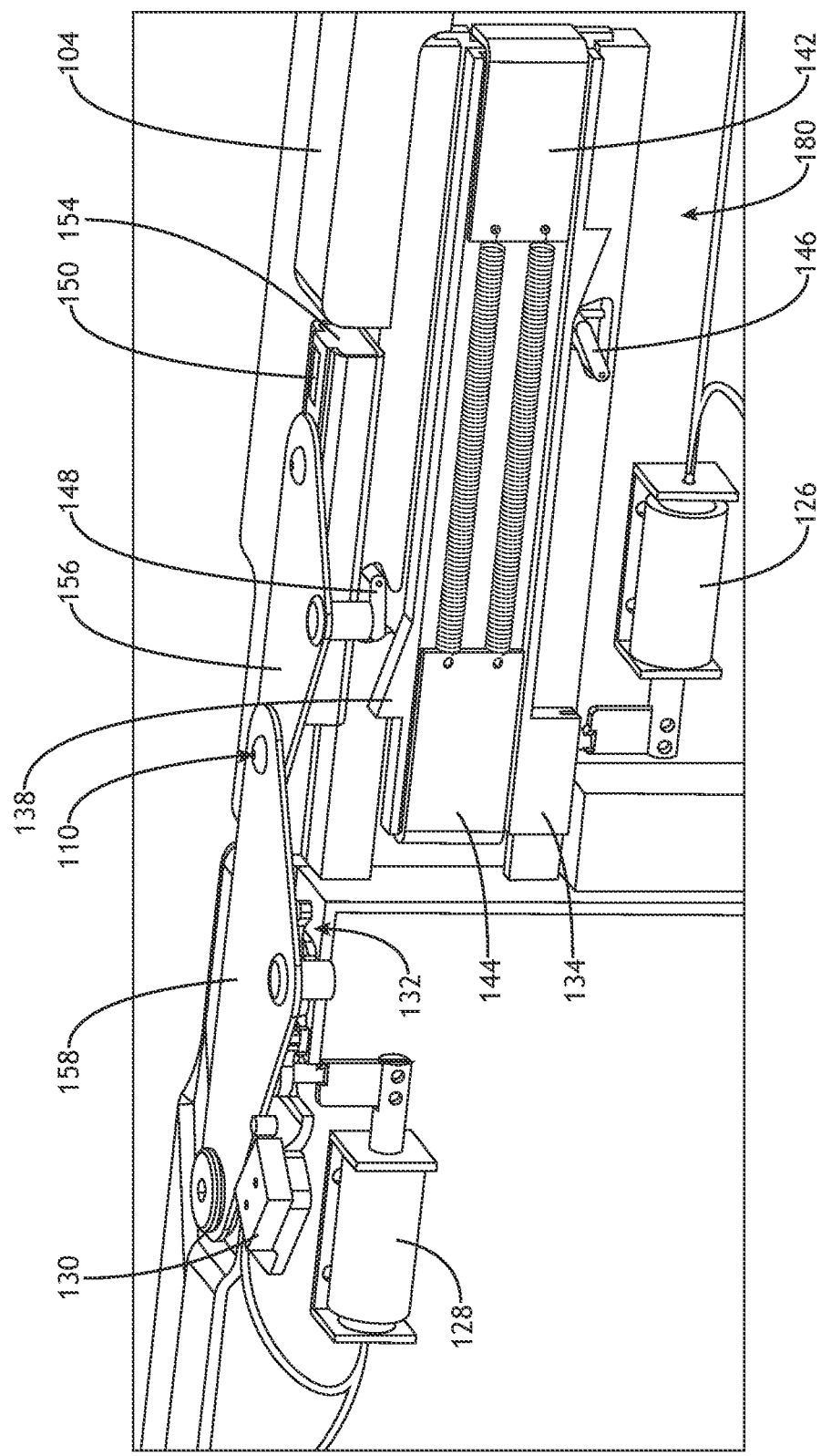
FIG. 2B is a detailed view of the hinging assembly of FIG. 2A showing the pivot point in a retracted state.
Figure 2C:
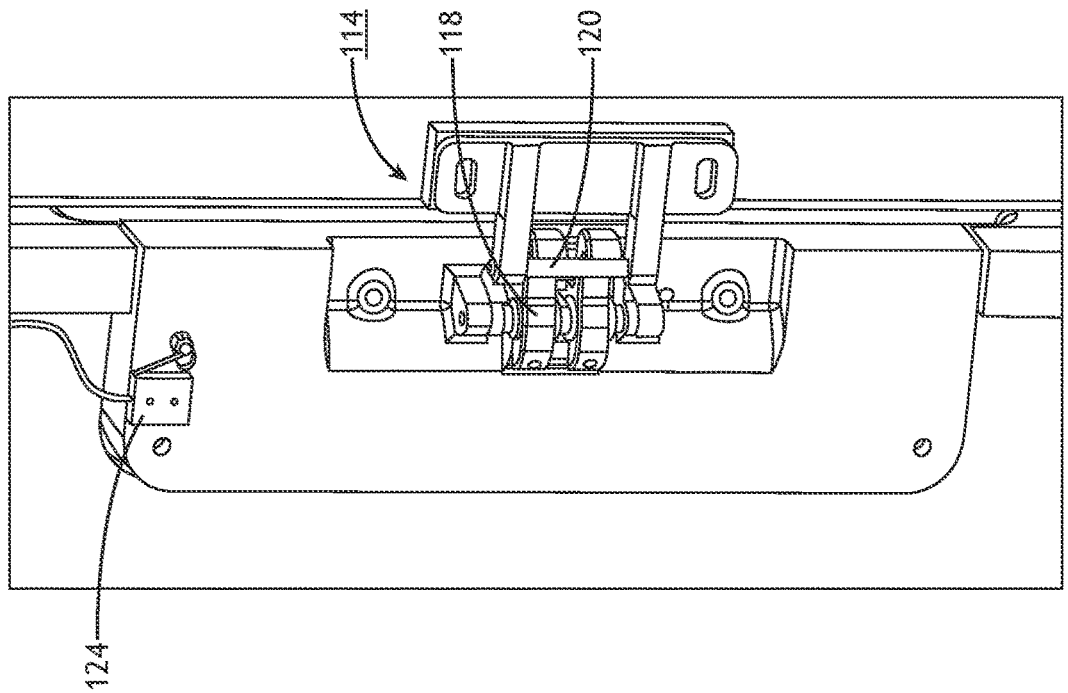
FIG. 2C is a detailed view of the door latch portion of the hinging assembly of FIG. 2A shown in a latched state.
Figure 2D:
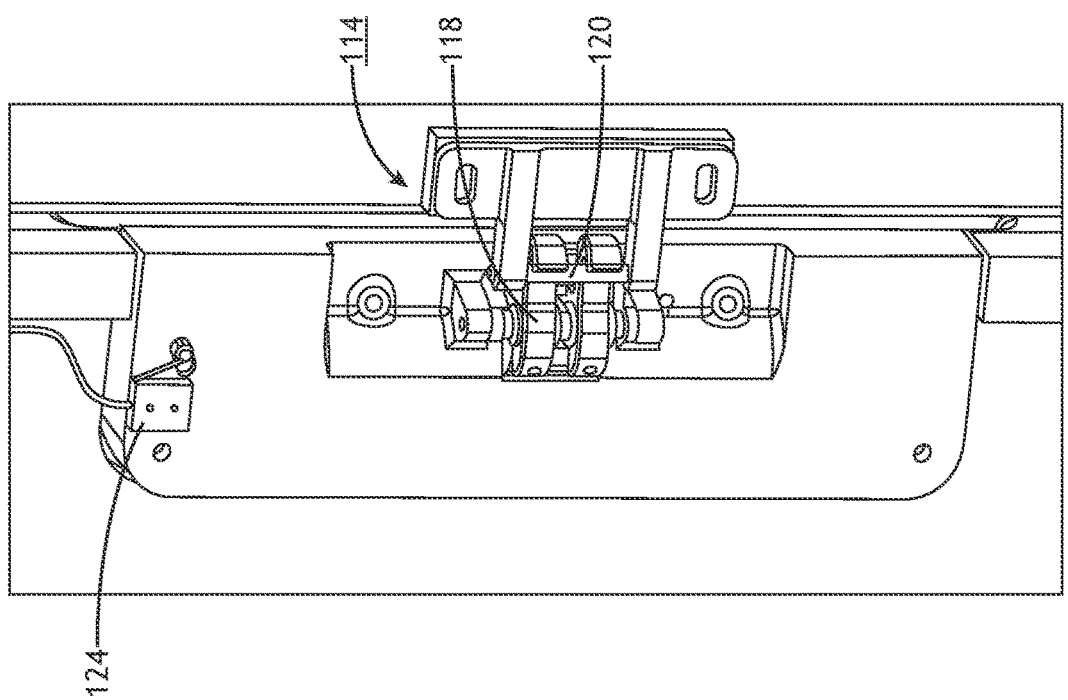
FIG. 2D is a detailed view of the door latch portion of the hinging assembly of FIG. 2A shown in an unlatched state.
Figure 2E:
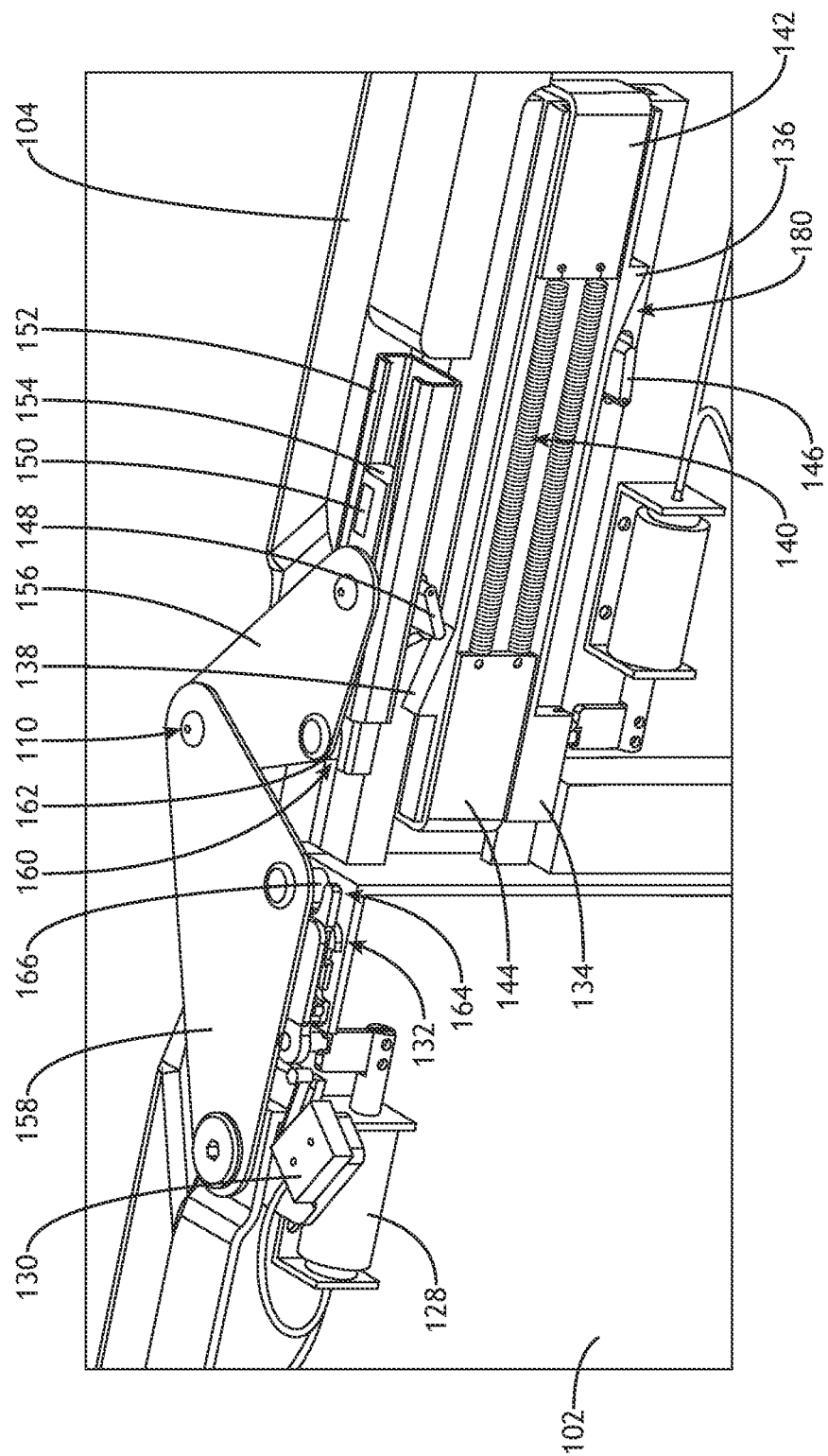
FIG. 2E is a detailed view of the hinging assembly of FIG. 2A showing the pivot point in an extended state.
Figure 2F:
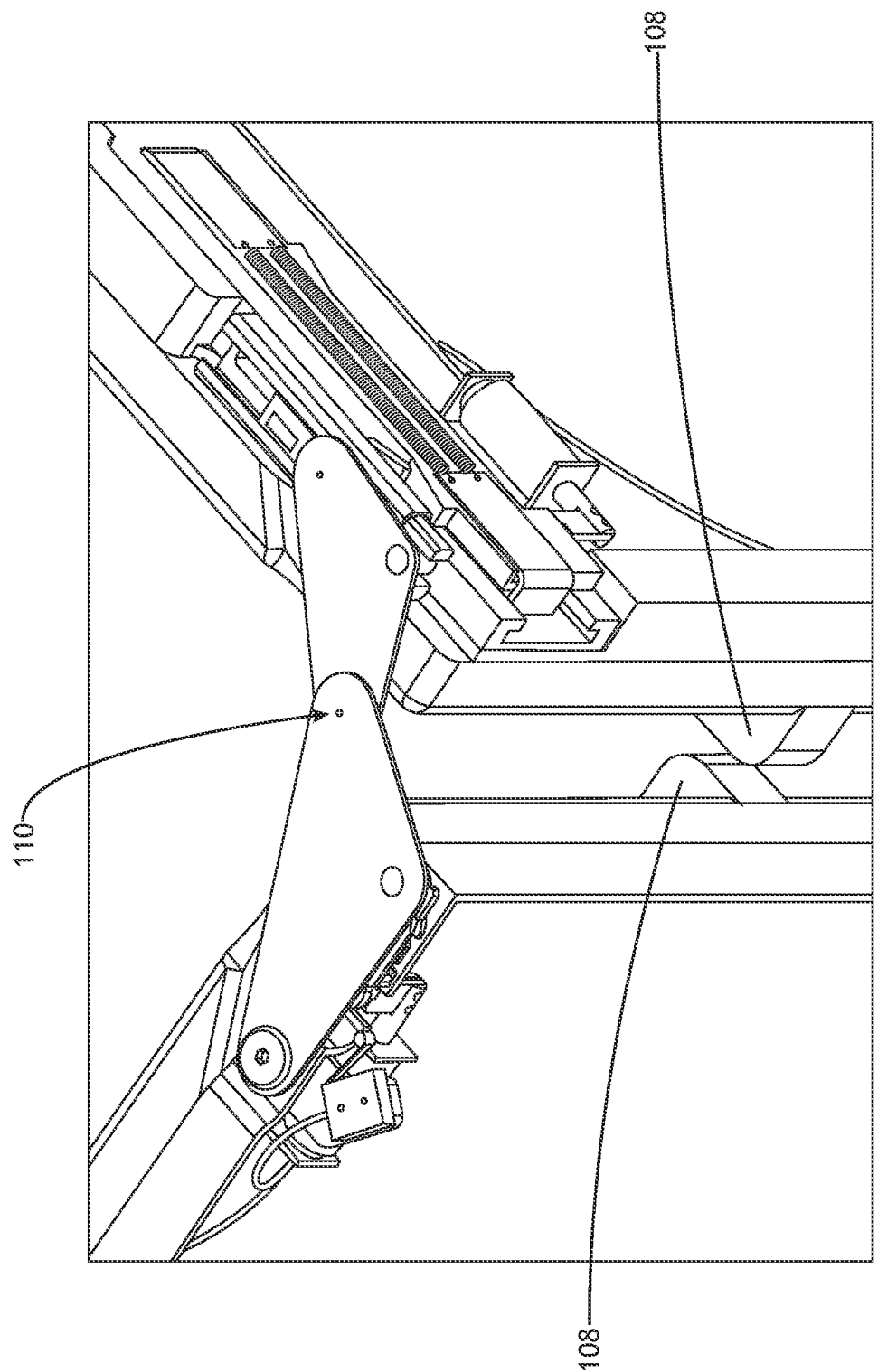
FIG. 2F is a detailed view of the hinging assembly of FIG. 2A showing the pivot point extended and the swinging door swung open to an open state.

With specific reference to FIGS. 2B and 2E, the double action spring mechanism 180 includes a translating spring plate 134 forming first and second catches 136, 138 on opposing top and bottom surfaces, and proximate opposite ends and in opposite facing directions. A spring assembly 140 carried on the spring plate 134 includes a pair of extension springs each attached at one end to a first spring assembly latch 142, and each attached at an opposing end to a second spring assembly latch 144. First and second spring-biased latches 146, 148 interact with the respective first and second catches 136, 138. Upon translating the spring plate 134 in a first direction, the first catch 136 disengages the rear latch 146 such that stored energy of the spring assembly 140 moves a slide plate 150 to an extended position and the second spring-biased latch 148 to engage the second catch 138. In other words, movement of the spring plate 134 in the first direction energizes the spring assembly 140 and continued movement of the spring plate 134 in the first direction causes the first catch 136 to release the first spring-biased latch 146 thereby causing translation of the slide plate 150 in the first direction. Movement of the spring plate 134 in the second direction, opposite the first direction, energizes the spring assembly 140 and continued movement of the spring plate 134 causes the second catch 138 to release the second spring-biased latch 148 thereby causing translation of the slide plate 150 in the second direction.

A longitudinally extending rail 152 guides a carriage 154 slidable along the rail 152. The carriage 154 is coupled to the slide plate 150 such that translation of the slide plate 150 causes translation of the carriage 154 in the same direction. For example, translating the spring plate 134 in the first direction (e.g., toward the attached edge of the swinging door 104) causes the stored energy in the spring assembly 140 to translate the slide plate 150 in the first direction thereby translating the carriage 154 in the first direction, while translating the spring plate 134 in the second direction (e.g., toward the free edge of the swinging door 104) causes the stored energy in the spring assembly 140 to translate the slide plate 150 in the second direction thereby translating the carriage 154 in the second direction.

A link arm 156 is pivotally attached at one end to the carriage 154, and pivotally attached at an opposing end to a bell crank 158. The pivotal attachment point of the link arm 156 and the bell crank 158 forms the shifting pivot point 110. The opposite end of the bell crank 158 is pivotally attached to the fixed structure 102. In use, carriage translation in the first direction (i.e., toward the attached edge of the swinging door 104) causes the pivot point 110 to extend from a first or concealed position to a second or extended position. In the first or concealed position as shown in FIG. 2B, the link arm 156 and bell crank 158 elements are positioned rearward of the front face of the swinging door 104, or at least rearward of the protruding trim pieces. In the second or extended position as shown in FIG. 2E, portions of the coupled ends of the link arm 156 and the bell crank 158 are shifted or driven forward of the front face of the swinging door 104, or forward of the protruding trim pieces, such that the pivot point 110 of the swinging door 104 is positioned in an extended position to allow the trim pieces to clear other trim pieces as the door opens.

With specific reference to FIG. 2E, a catch 160 formed at one end of the carriage 154 captures a vertical post 162 carried on the link arm 156 as the carriage moves toward the first direction, thereby maintain the pivot point 110 in the extended position. In addition, the locking mechanism 132 on the fixed structure 102 also defines a catch 164 for capturing a vertical post 166 carried on the bell crank 158 to maintain the extended pivot point position. Reversal of the locking mechanism 132 by the second drive solenoid 128 allows the bell crank 158 and link arm 156 to return to their concealed position as the carriage 154 translates in the second direction away from the attached edge of the swinging door 104. With specific reference to FIG. 2F, with the door pivot point 110 in the extended position, the swinging door 104 is clear to pivot open and closed without trim interference.

Referring to FIGS. 3A-3D, an alternative embodiment of a door hinge assembly and compartment door assembly includes a mechanical actuator mechanism. As in the first embodiment, the door handle assembly 114 attached to the door includes a latch 118 that interacts with a catch 120 on the fixed structure 102, another swinging door, etc., to maintain the door closed. A mechanical actuator mechanism 170 includes a first Bowden cable 172 coupled between the door handle assembly 114 and the double action spring mechanism 180, and more specifically, the spring plate 134, and a second Bowden cable 174 coupled between the swinging door 104 and the spring plate 134. Like the first electrically actuated embodiment, the mechanically actuated embodiments may include additional Bowden cables coupled between their respective actuating element and their respective spring plate 134.

Figure 3A:
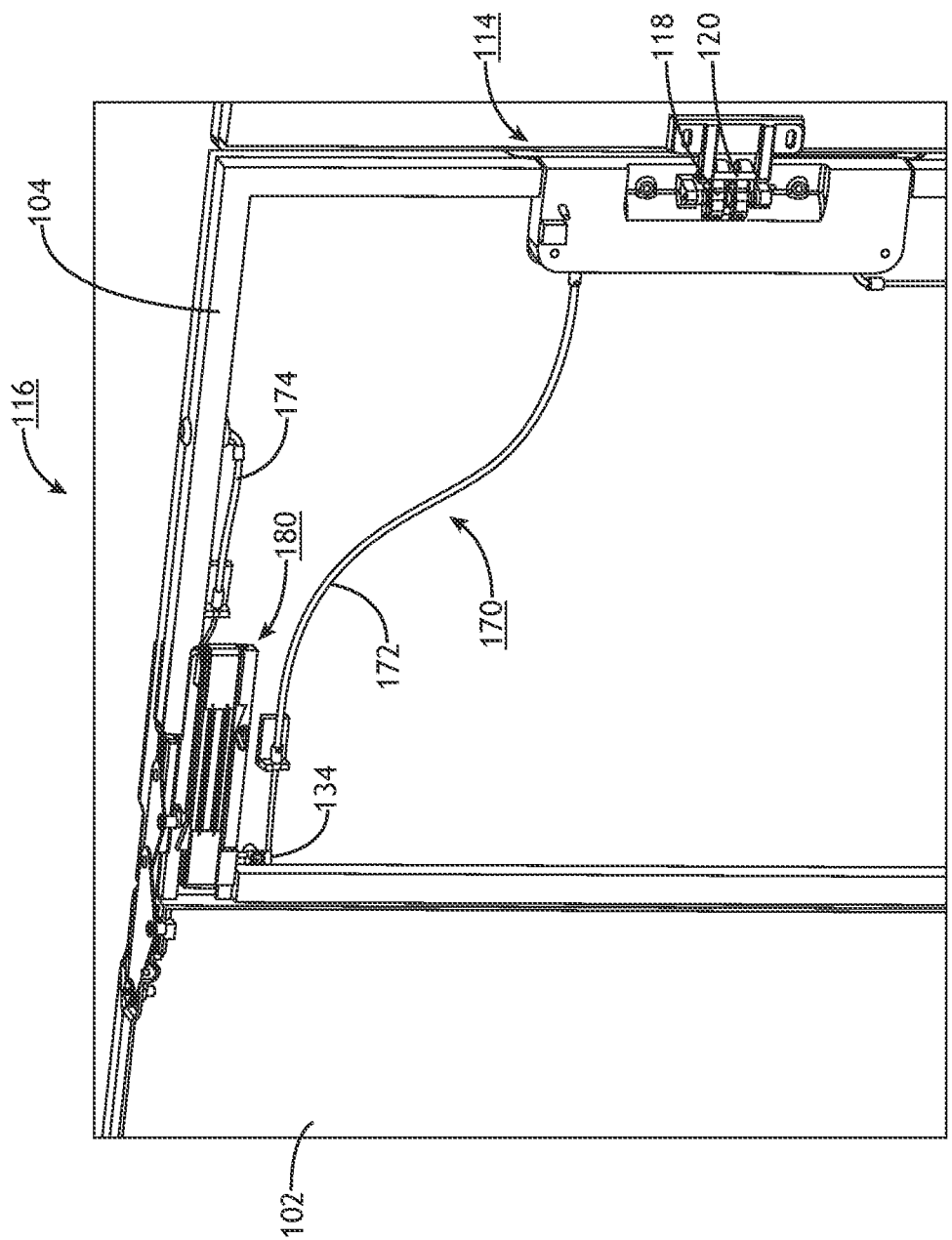
FIG. 3A is a fragmentary perspective view of a hinging assembly according to the present disclosure including a cable actuated spring-based mechanism for extending the hinging assembly pivot point.
Figure 3B:
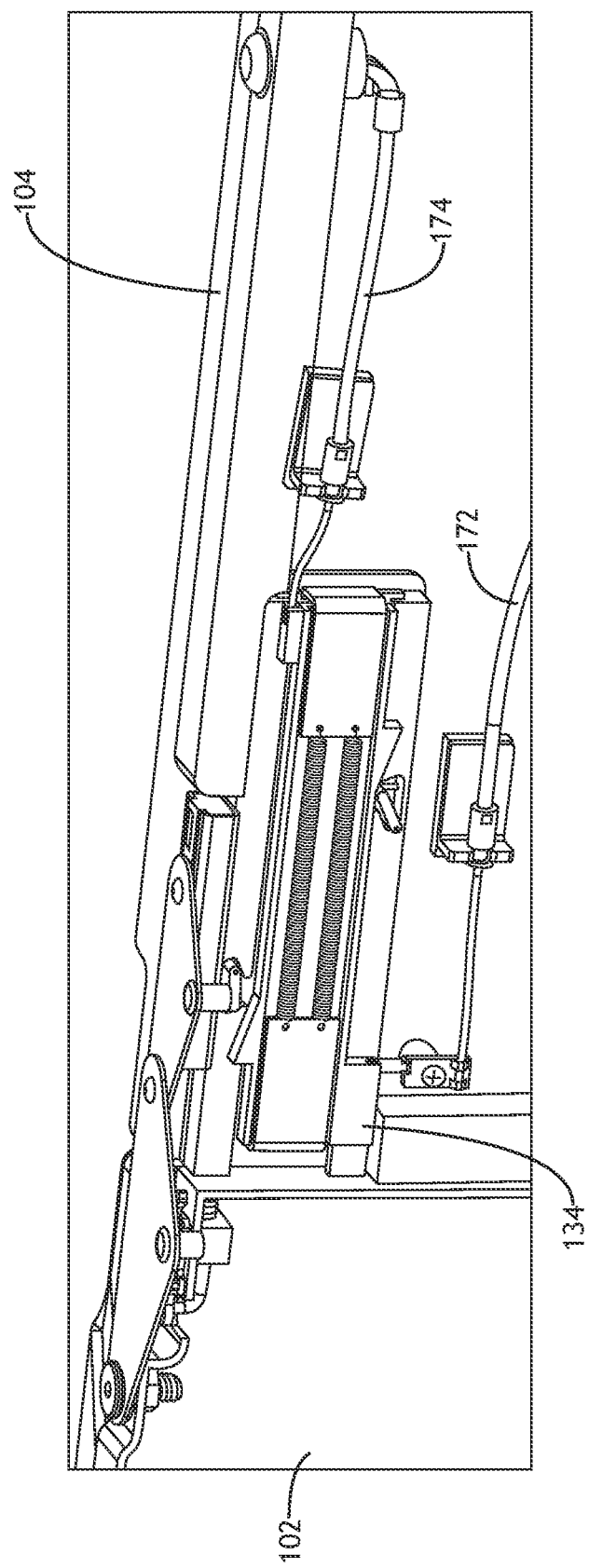
FIG. 3B is a detailed view of the hinging assembly of FIG. 3A showing the pivot point in a retracted state.
Figure 3C:
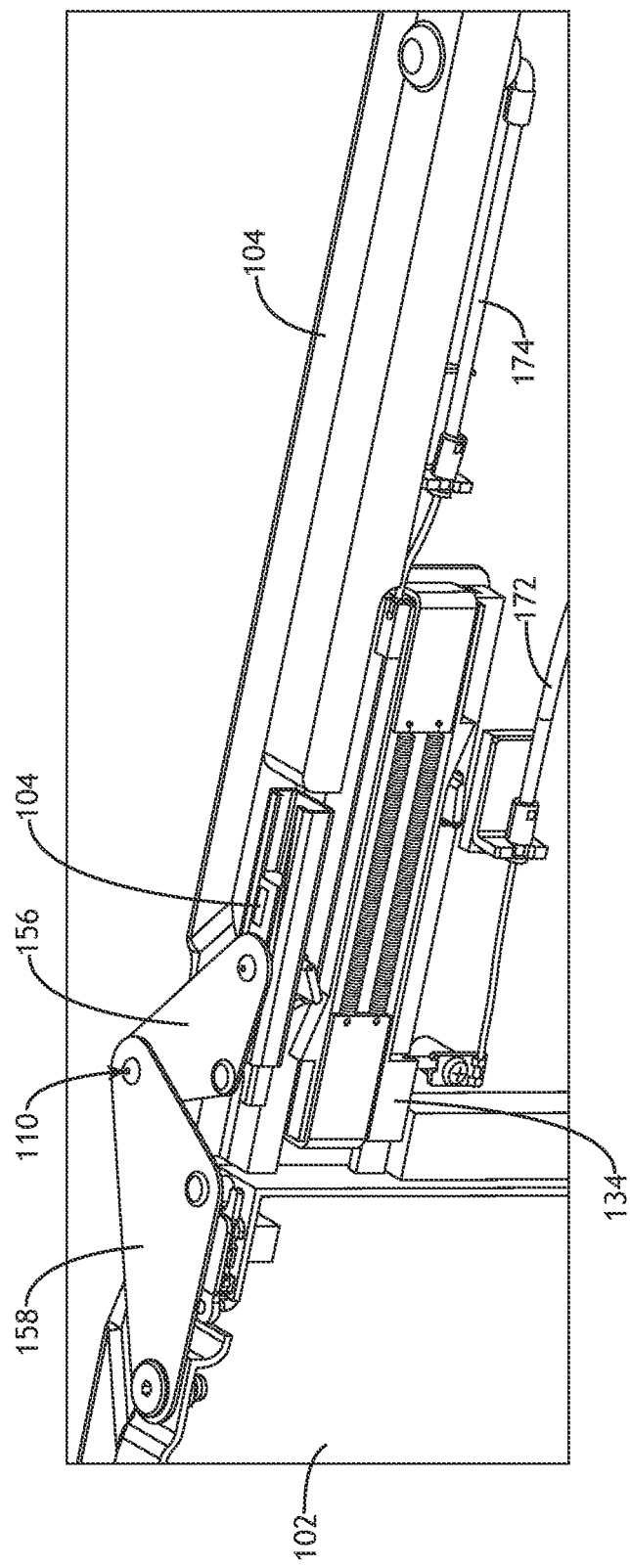
FIG. 3C is a detailed view of the hinging assembly of FIG. 3A showing the pivot point in an extended state.
Figure 3D:
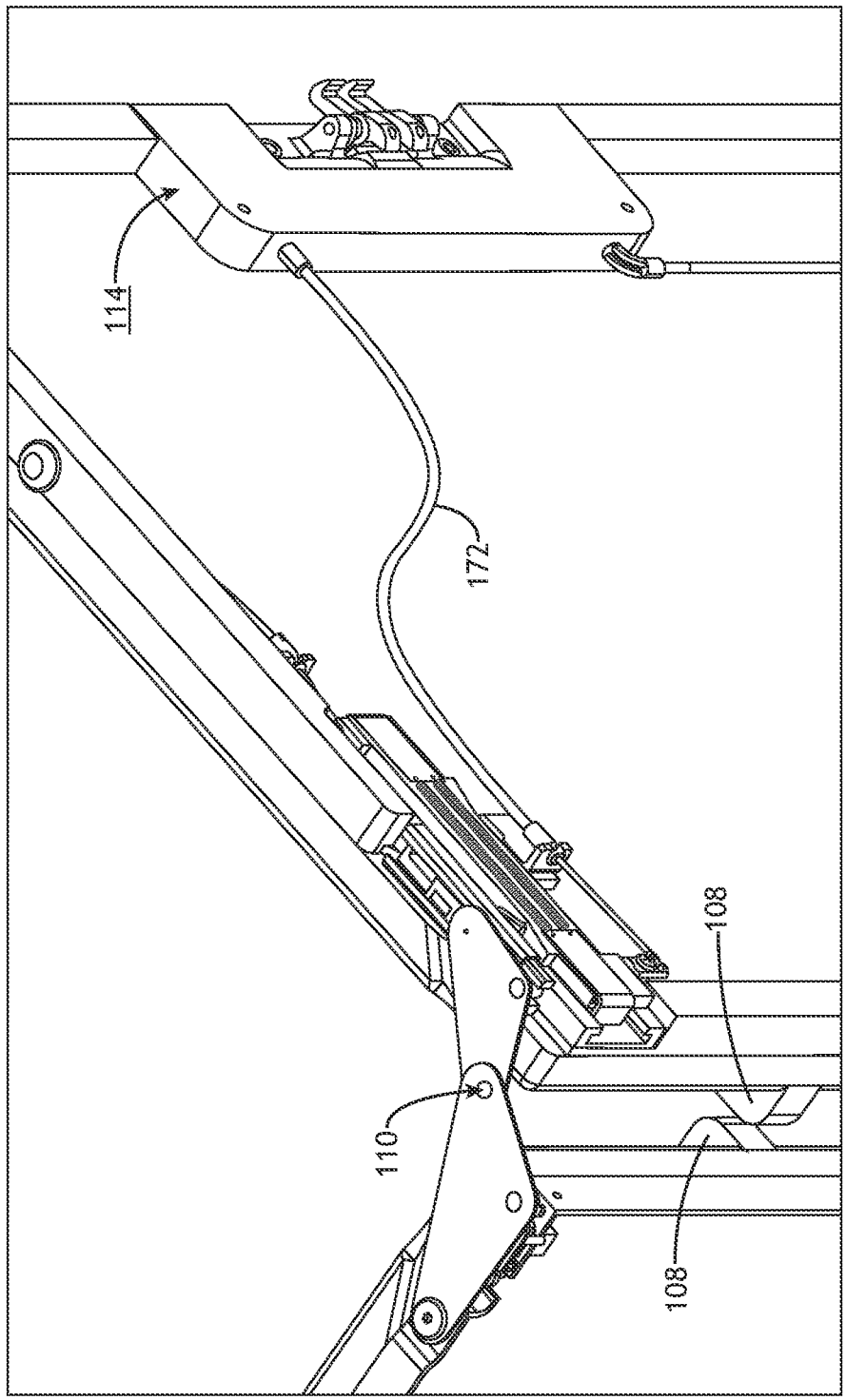
FIG. 3D is a detailed view of the hinging assembly of FIG. 3A showing the pivot point in an extended state and the swinging door swung open to an open state.

With specific reference to FIGS. 3B and 3C, in use, actuating the door handle, for instance rotation depressing the handle assembly, causes the first Bowden cable 172 to translate the spring plate 134 to energize the spring assembly to translate the carriage. Upon translating the spring plate 134 in the first direction, the first catch disengages the rear latch such that stored energy of the spring assembly moves the slide plate to the extended position and the second spring-biased latch to engage the second catch. In other words, movement of the spring plate 134 in the first direction energizes the spring assembly and continued movement of the spring plate 134 in the first direction causes translation of the slide plate in the first direction. Movement of the spring plate 134 in the second direction, opposite the first direction, energizes the spring assembly and continued movement of the spring plate 134 causes translation of the slide plate in the second direction.

The carriage is again coupled to the slide plate such that translation of the slide plate causes translation of the carriage in the same direction. The link arm 156 is again pivotally attached at one end to the carriage, and pivotally attached at its opposing end to the bell crank 158. The opposite end of the bell crank 158 is pivotally attached to the fixed structure 102 such that, in use, carriage translation in the first direction causes the door pivot point 110 to extend or shift from the concealed position to the extended position. The concealed position is shown in FIG. 3B, while the extended position is shown in FIG. 3C. With specific reference to FIG. 3D, with the door pivot point 110 in the extended position, the swinging door 104 is clear to pivot open and closed without trim interference.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A door hinge assembly, comprising:
   a double action spring mechanism for attachment to a swinging door;
   a sliding carriage coupled to a spring plate of the double action spring mechanism, the sliding carriage slidable along a rail;
   a link arm having a first end pivotally attached to the sliding carriage, and a second end forming a shifting pivot point of the swinging door;
   a bell crank having a first end for pivotal attachment to a fixed structure supporting the swinging door, and a second end pivotally attached to the shifting pivot point of the link arm; and
   an actuator mechanism operable for:
      translating the spring plate in a first direction to energize the double action spring mechanism to translate the sliding carriage in the first direction causing the shifting pivot point to shift from a first position to a second position; and
      translating the spring plate in a second direction, opposite the first direction, to energize the double action spring mechanism to translate the sliding carriage in the second direction causing the shifting pivot point to shift from the second position to the first position.

2. The door hinge assembly according to claim 1, wherein the double action spring mechanism comprises:
the spring plate forming first and second catches;
a spring assembly carried on the spring plate, the spring assembly including a pair of extension springs each attached at one end to a first spring assembly latch, and each attached at an opposing end to a second spring assembly latch; and
first and second spring-biased latches for interacting with the respective first and second catches;
wherein movement of the spring plate in the first direction energizes the spring assembly and continued movement of the spring plate in the first direction causes the first catch to release the first spring-based latch thereby causing translation of the carriage in the first direction, and movement of the spring plate in the second direction, opposite the first direction, energizes the spring and continued movement of the spring plate causes the second latch to release the second spring-based latch thereby causing translation of the carriage in the second direction.

3. The door hinge assembly according to claim 1, wherein the first position corresponds to a concealed position of the door hinge assembly in which the shifting pivot point is positioned rearward of a front face of the swinging door, and wherein the second position corresponds to an extended position of the door hinge assembly in which the shifting pivot point is positioned forward of the front face of the swinging door.

4. The door hinge assembly according to claim 1, wherein the sliding carriage forms a catch at one end, the link arm carries a post, and the post is captured in the catch formed at the one end of the link arm when the shifting pivot point is in the second position.

5. The door hinge assembly according to claim 1, further comprising a locking mechanism attachable to the fixed structure and positionable proximate the bell crank, wherein the bell crank carries a post captured in the locking mechanism when the shifting pivot point is in the second position.

6. The door hinge assembly according to claim 1, wherein the actuator mechanism comprises:
a door handle assembly;
a first Bowden cable coupled between the door handle assembly and the double action spring mechanism, wherein actuating the door handle assembly causes the first Bowden cable to translate the spring plate in the first direction causing the shifting pivot point to shift from the first position to the second position; and
a second Bowden cable is coupled between the swinging door and the double action spring mechanism, wherein closing the swinging door causes the second Bowden cable to translate the spring plate in the second direction causing the shifting pivot point to shift from the second position to the first position.

7. The door hinge assembly according to claim 5, wherein the actuator mechanism comprises:
a door handle assembly including a latch and a catch;
a micro switch;
a first drive solenoid attached to the swinging door and electrically coupled to the micro switch and mechanically coupled to the spring plate of the double action spring mechanism;
a second drive solenoid attachable to the fixed structure and electrically coupled to the micro switch and mechanically coupled to the locking mechanism; and
wherein depressing the door handle assembly to release the latch from the catch causes the micro switch to activate the first drive solenoid to translate the spring plate in the first direction causing the shifting pivot point to shift from the first position to the second position; and
wherein re-engaging the latch with the catch causes the micro switch to activate the first drive solenoid to translate the spring plate in the second direction causing the shifting pivot point to shift from the second position to the first point; and
wherein the micro switch is operable for activating the second drive solenoid to lock and unlock the locking mechanism.

8. A compartment door assembly, comprising:
a swinging door;
a fixed structure proximate the swinging door; and
at least one door hinge assembly configured to movably couple the swinging door to the fixed structure, the at least one door hinge assembly comprising:
a double action spring mechanism attached to the swinging door;
a sliding carriage coupled to a spring plate of the double action spring mechanism, the sliding carriage slidable along a rail;
a link arm having a first end pivotally attached to the sliding carriage, and a second end forming a shifting pivot point of the swinging door;
a bell crank having a first end pivotally attached to the fixed structure, and a second end pivotally attached to the shifting pivot point of the link arm; and
an actuator mechanism operable for:
translating the spring plate in a first direction to energize the double action spring mechanism to translate the sliding carriage in the first direction causing the shifting pivot point to shift from a first position to a second position; and
translating the spring plate in a second direction, opposite the first direction, to energize the double action spring mechanism to translate the sliding carriage in the second direction causing the shifting pivot point to shift from the second position to the first position.

9. The compartment door assembly according to claim 8, wherein the double action spring mechanism comprises:
the spring plate forming first and second catches;
a spring assembly carried on the spring plate, the spring assembly including a pair of extension springs each attached at one end to a first spring assembly latch, and each attached at an opposing end to a second spring assembly latch; and
first and second spring-biased latches for interacting with the respective first and second catches;
wherein movement of the spring plate in the first direction energizes the spring assembly and continued movement of the spring plate in the first direction causes the first catch to release the first spring-based latch thereby causing translation of the carriage in the first direction, and movement of the spring plate in the second direction, opposite the first direction, energizes the spring and continued movement of the spring plate causes the second latch to release the second spring-based latch thereby causing translation of the carriage in the second direction.

10. The compartment door assembly according to claim 8, wherein:
the swinging door comprises at least one protruding trim piece;

the first position corresponds to a concealed position of the door hinge assembly in which the shifting pivot point is positioned rearward of the at least one protruding trim piece; and the second position corresponds to an extended position of the door hinge assembly in which the shifting pivot point is positioned forward of the at least one protruding trim piece.

11. The compartment door assembly according to claim 8, wherein the sliding carriage forms a catch at one end, the link arm carries a post, and the post is captured in the catch formed at the one end of the link arm when the shifting pivot point is in the second position.

12. The compartment door assembly according to claim 8, further comprising a locking mechanism attached to the fixed structure and positioned proximate the bell crank, wherein the bell crank carries a post captured in the locking mechanism when the shifting pivot point is in the second position.

13. The compartment door assembly according to claim 12, wherein the actuator mechanism comprises:
- a door handle assembly including a latch and a catch;
- a micro switch;
- a first drive solenoid attached to the swinging door and electrically coupled to the micro switch and mechanically coupled to the spring plate of the double action spring mechanism;
- a second drive solenoid attachable to the fixed structure and electrically coupled to the micro switch and mechanically coupled to the locking mechanism; and
- wherein depressing the door handle assembly to release the latch from the catch causes the micro switch to activate the first drive solenoid to to translate the spring plate in the first direction causing the shifting pivot point to shift from the first position to the second position; and
- wherein re-engaging the latch with the catch causes the micro switch to activate the first drive solenoid to to translate the spring plate in the second direction causing the shifting pivot point to shift from the second position to the first point; and
- wherein the micro switch is operable for activating the second drive solenoid to lock and unlock the locking mechanism.

14. The compartment door assembly according to claim 8, wherein the actuator mechanism comprises:
- a door handle assembly;
- a first Bowden cable coupled between the door handle assembly and the double action spring mechanism, wherein actuating the door handle assembly causes the first Bowden cable to translate the spring plate in the first direction causing the shifting pivot point to shift from the first position to the second position; and
- a second Bowden cable is coupled between the swinging door and the double action spring mechanism, wherein closing the swinging door causes the second Bowden cable to translate the spring plate in the second direction causing the shifting pivot point to shift from the second position to the first position.

15. The compartment door assembly according to claim 8, comprising at least two of the hinge assemblies, positioned in spaced relation, pivotally coupling the swinging door to the fixed structure.

* * * * *